United States Patent
Dao et al.

[11] Patent Number: 6,128,687
[45] Date of Patent: Oct. 3, 2000

[54] FAST FAULT DETECTION CIRCUITRY FOR A MICROPROCESSOR

[75] Inventors: Tuan Q. Dao, Richardson; Duc Q. Bui, Dallas, both of Tex.

[73] Assignee: Texas Instrumenets Incorporated, Dallas, Tex.

[21] Appl. No.: 09/118,470

[22] Filed: Jul. 17, 1998

Related U.S. Application Data

[60] Provisional application No. 60/053,540, Jul. 23, 1997.
[51] Int. Cl.$^7$ ............................. G06F 11/20; G06F 13/40
[52] U.S. Cl. ........................... 710/129; 710/64; 370/422; 370/382; 714/21; 714/10
[58] Field of Search ..................... 360/51, 40; 712/203; 714/9, 12, 6, 11, 10, 3, 21; 711/113; 340/825.36, 310.06; 710/64, 129, 131, 23; 370/463, 422, 382, 388

[56] References Cited

U.S. PATENT DOCUMENTS

5,058,104  10/1991  Yonehara et al. ................ 340/825.36
5,168,499  12/1992  Peterson et al. ...................... 371/11.3

Primary Examiner—Daniel H. Pan
Attorney, Agent, or Firm—Robert D. Marshall, Jr.; Gerald E. Laws; Richard L. Donaldson

[57] ABSTRACT

Logic circuitry (70, 80, 90) for performing fault detection in a microprocessor (5) is disclosed. The fault detection logic circuitry (70, 80, 90) may be implemented into a scheduler (50) in a floating-point unit (31). Mask register (M) bit positions ($M_0$ through $M_7$) store state information relative to registers (52) or other resources in the microprocessor (5) that is to be interrogated upon scheduling of an instruction. The instruction includes an encoded address communicated on register address lines (SA) that is received by the fault detection logic circuitry (70, 80, 90). Pass gates (72) are controlled by the encoded address on the register address lines (SA) to generate a fault indicator (FLT). Partitioning of the decoding of the encoded address may be utilized for optimization of the fault detection operation.

18 Claims, 4 Drawing Sheets

FAST FAULT DETECTION CIRCUITRY FOR A MICROPROCESSOR

This application claims priority under 35 USC 119(e)(1) of provisional application No. 60/053,540 filed Jul. 23, 1997.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of microprocessor and other integrated logic circuits, and is more specifically directed to fault detection circuitry therein.

A common function performed by conventional microprocessors in preparing an instruction for execution is referred to as fault detection. Fault detection, in general, determines whether a register or memory location is available for use in connection with the instruction. For example, a read fault occurs if an instruction that is about to be executed (or, in simple cases, is being executed) includes a read of data from a register or memory location that does not contain valid data; conversely, a write fault occurs if an instruction includes a write of data to a register or memory location that is already in use (i.e., contains valid data from a different operation). In the event that a fault is detected, the fault detection circuitry may issue an exception, causing the microprocessor to process certain control operations to clear the exception.

Fault detection is especially important in microprocessors of the pipelined type, in which multiple instructions are processed simultaneously along various stages of execution. The effective rate at which instructions are executed by a pipelined microprocessor can approach one instruction per machine cycle per pipeline, even though the processing of each individual instruction may require multiple machine cycles from fetch through execution. In a pipelined microprocessor, fault detection is typically performed during the scheduling pipeline stage, so that an instruction involving a read or write fault is not issued to execution. Fault detection may be performed not only relative to previously executed and completed instructions, but also relative to instructions that are not yet executed but which are further along in the pipeline. Handling of faults in pipelined microprocessors generally involves the flushing and refilling of the pipeline, and thus involve significant delay.

Figure 1:
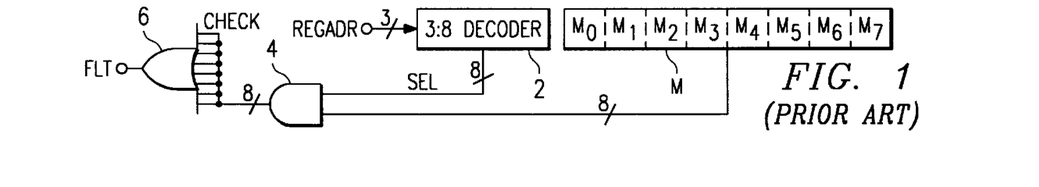
FIG. 1 is an electrical diagram, in schematic form, of fault detection logic according to the prior art.

According to prior techniques, fault detection is performed in a relatively simple manner by straightforward logic. Attention is directed, in this regard, to FIG. 1, which illustrates conventional fault detection logic, as is typically implemented into the scheduling circuitry of the microprocessor. In this conventional arrangement, write fault detection is being performed upon an instruction that includes a three-bit address indicating one of eight possible registers to which a write is to be effected upon execution of the instruction. Selection information, such as register and memory addresses, are typically contained within instructions in encoded form, to save word width and thus chip area. In the conventional fault detection logic of FIG. 1, the register address is communicated on three lines REGADR to the input of 3:8 decoder 2 which, in turn, drives one of eight output lines SEL to an active state in response to the address on lines REGADR. Lines SEL from decoder 2 are applied to inputs of AND function 4. Mask register M, according to this conventional arrangement, includes eight bit positions $M_0$ through $M_7$ corresponding to the eight registers; each of bit positions $M_0$ through $M_7$ indicate, when set, that its corresponding register contains valid data, such that the execution of a write thereto would constitute a write fault. State or condition information, such as the valid data information stored in bit positions $M_0$ through $M_7$ of mask register M, is generally stored in decoded form, to eliminate the need for decoder circuitry and considering that the extent to which the state information is to be communicated within the integrated circuit is relatively small. The contents of mask register M are also applied to inputs of AND function 4.

AND function 4 performs eight bit-by-bit logical AND operations between each of lines SEL from decoder 2 and a corresponding one of the bit positions $M_0$ through $M_7$ communicated thereto; as such, AND function 4 has eight outputs, on lines CHECK, at which the results of the eight logical ANDs are presented. In this example, assuming active and set states are at a high logic level, AND function 4 will drive a high logic level at one of lines CHECK if the register location addressed by the instruction under test (as indicated by lines REGADR) already contains valid data (as indicated by the corresponding one of bit positions $M_0$ through $M_7$ of mask register M). The states of lines CHECK from the output of AND function 4 are combined by OR function 6 to drive line FLT that indicates, when high, that a write fault is detected.

The conventional logic of FIG. 1 is thus operable to detect write faults in microprocessor instructions; similar logic will also be used to detect read faults, in which case the fault will be indicated if the addressed register does not contain valid data. In either case, significant delay is encountered in this conventional logic realization of the fault detection logic. For example, 3:8 decoder 2 is generally realized with a gate depth of three, and eight-input OR function 6 is generally realized with a gate depth of two. As such, the overall gate depth of the conventional logic realization of FIG. 1 is about six, considering one gate delay for AND function 4.

While six gate delays may be considered to be insignificant in modern VLSI microprocessors, it has been observed, in connection with the present invention, that fault detection may be part of a critical path in the instruction flow, such that any additional delay in fault detection directly affects the microprocessor performance. For example, fault detection performance has been observed to be particularly critical in the performance of on-chip floating-point units (FPU), where the performance of the microprocessor in executing complex computational routines is directly affected by the time required for scheduling of instructions, particularly in the repetitive instruction loops often encountered in floating-point computational routines.

BRIEF SUMMARY OF THE INVENTION

It is therefore an object of the present invention to provide fault detection logic and a method of performing fault detection having reduced propagation delay.

It is a further object of the present invention to provide such fault detection circuitry that is particularly useful in a high-performance microprocessor.

It is a further object of the present invention to provide such fault detection circuitry that are applicable for varying numbers of registers or memory locations to be tested.

It is a further object of the present invention to provide such fault detection circuitry that may be applicable to other comparison operations in a modem microprocessor.

Other objects and advantages of the present invention will be apparent to those of ordinary skill in the art having reference to the following specification together with its drawings.

The present invention may be implemented into circuitry for interrogating the state, or condition, of one of a plurality of resources selected according to encoded information, such as may be contained within an instruction, where the state information for the plurality of resources is stored in a decoded form. According to the present invention, the circuitry includes at least one multiplexer made up of a plurality of pass gates, one for each of the plurality of resources, each of which is controlled by one of the bits of the encoded information, either directly or after decoding. The pass gates receive, at an input, a corresponding bit of the state information in its decoded form, and have their outputs connected in a wired-OR fashion, to communicate the state information for the selected resource.

In the context of a microprocessor, the present invention may be implemented into circuitry, such as fault detection circuitry, arranged as a multiplexer of pass gates controlled either directly by the register or memory address contained within the instruction or by the output of a decoder for the encoded information. The pass gates receive a corresponding bit from a mask register on one side, and are connected in a wired-OR configuration on another side. The result of the wired-OR thus indicates the state of the mask bit for the selected register location. The extent to which the encoded address information is decoded, and the pass gates sequenced, may vary so as to optimize fault detection in a particular realization.

DETAILED DESCRIPTION OF THE INVENTION

Figure 2:
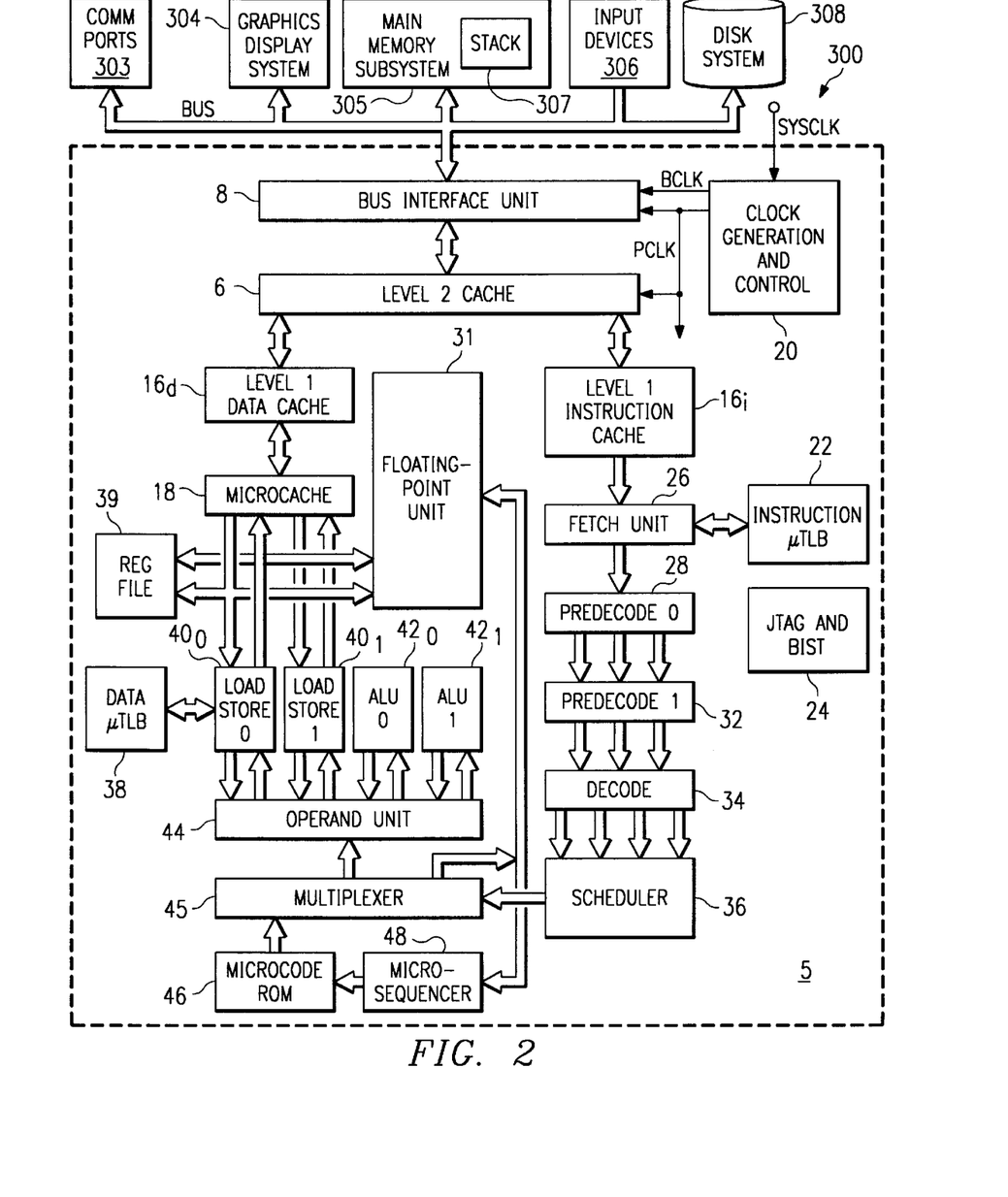
FIG. 2 is an electrical diagram, in block form, of a microprocessor and system constructed according to the preferred embodiment of the invention.

Referring now to FIG. 2, an exemplary data processing system 300, including an exemplary superscalar pipelined microprocessor 5 within which the preferred embodiment of the invention is implemented, will be described. It is to be understood that the architecture of system 300 and of microprocessor 5 is described herein by way of example only, as it is contemplated that the present invention may be utilized in microprocessors of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 5, as shown in FIG. 2, is connected to other system devices by way of external bus BUS. While external bus BUS, in this example, is shown as a single bus, it is of course contemplated that external bus BUS may represent multiple buses having different speeds and protocols, as is known in conventional computers utilizing the PCI local bus architecture. System 300 contains such conventional subsystems as communication ports 303 (including modem ports and modems, network interfaces, and the like), graphics display system 304 (including video memory, video processors, a graphics monitor), main memory system 305 which is typically implemented by way of dynamic random access memory (DRAM) and which includes conventional memory stack 307, input devices 306 (including keyboard, a pointing device, and the interface circuitry therefor), and disk system 308 (which may include hard disk drives, floppy disk drives, and CD-ROM drives). It is therefore contemplated that system 300 of FIG. 2 corresponds to a conventional desktop computer or workstation, as are now common in the art. Of course, other system implementations of microprocessor 5 can also benefit from the present invention, as will be recognized by those of ordinary skill in the art.

Microprocessor 5 includes bus interface unit (BIU) 8 connected to external bus BUS, which controls and effects communication between microprocessor 5 and the other elements in a system 300. BIU 8 includes the appropriate control and dock circuitry to perform this function, including write buffers for increasing the speed of operation, and including timing circuitry so as to synchronize the results of internal microprocessor operation with bus BUS timing constraints. Microprocessor 5 also indudes clock generation and control circuitry 20 which, in this example, generates clock phases based upon system clock SYSCLK.

As is evident in FIG. 2, microprocessor 5 has three levels of internal cache memory, with the highest of these being unified (i.e., data and instruction) level 2 cache 6, which is connected to BIU 8 by way of an internal bus. Level 2 cache 6, as shown in FIG. 2, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 2, microprocessor 5 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. Data microtranslation lookaside buffer ($\mu$TLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

This pipeline, referred to hereinbelow as the "integer pipeline" operates cooperatively with the floating-point pipeline of FPU 31, as will be described in detail below.

As shown in FIG. 2, the operations of the integer pipeline are performed by various functional blocks within microprocessor 5. Fetch unit 26 generates instruction addresses from the instruction pointer by way of instruction microtranslation lookaside buffer ($\mu$TLB) 22 and level 1 instruction cache $16_i$, which produces a stream of instruction data to fetch unit 26, which in turn provides instruction codes to predecode 0 stage 28 and predecode 1 stage 32 in the desired sequence. Predecode 0 stage 28 determines the size and position of as many as three variable-length x86 instructions, while predecode 1 stage 32 recodes the multibyte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps corresponding to microcoded microinstructions such as complex or rarely-used x86 instructions, x86 instructions that modify segment or control registers, handling of exceptions and interrupts, and multicycle instructions.

Microprocessor 5 also includes circuitry 24 for controlling the operation of JTAG scan testing, and of certain built-in self-test (BIST) functions, ensuring the validity of the operation of microprocessor 5 upon completion of manufacturing, and upon resets and other events.

Figure 3:
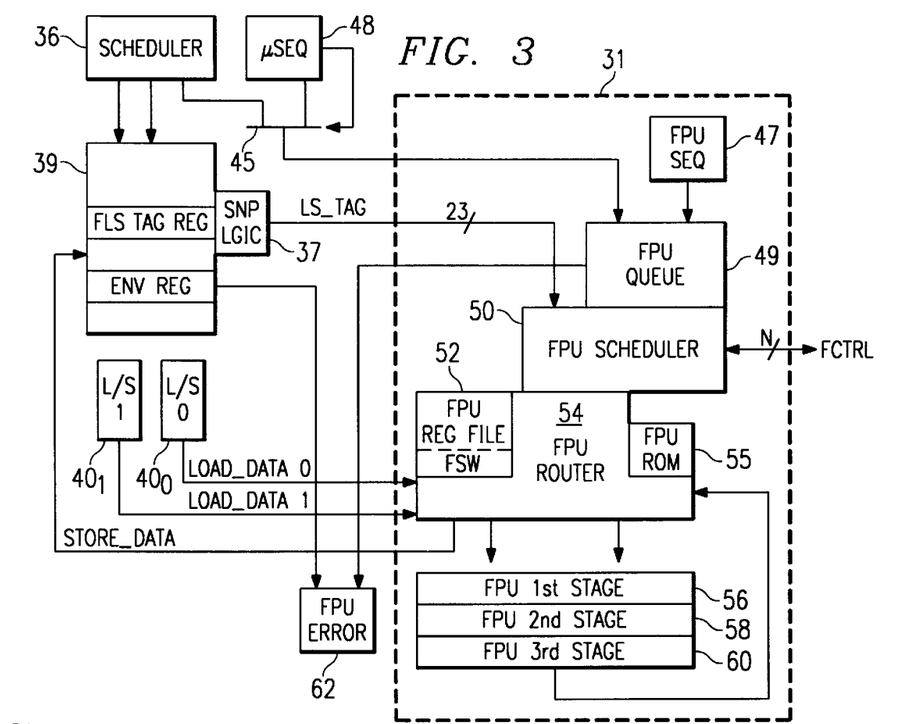
FIG. 3 is an electrical diagram, in block form, of a floating-point unit in the microprocessor of FIG. 2.

Referring now to FIG. 3, the construction of FPU 31 according to this embodiment of the invention, and its interconnection with the other functional blocks of microprocessor 5, will now be described in detail. This construction of FPU 31 is presented by way of example only, as it is to understood that the present invention will be beneficial in the implementation of floating-point units constructed according to other architectures and designs.

FPU 31 includes FPU queue stage 49, which is effectively an instruction buffer between the integer portions of microprocessor 5 and the execution stages of FPU 31. FPU queue stage 49 receives FPU instructions from scheduler 36 or from integer microsequencer 48 (in the case of microcoded instructions), via multiplexer 45 that is under the control of microsequencer 48. FPU queue stage 49 also receives FPU instructions from FPU microsequencer 47, for the execution of microcoded FPU instructions.

FPU queue stage 49 is connected to FPU scheduler 50 which, in this example, performs the scheduling function for floating-point instructions separately from scheduler 36 in the integer portion of microprocessor 5. FPU scheduler 50 is logic that operates in similar fashion as scheduler 36, responsive to instructions forwarded thereto from FPU queue stage 47, and also responsive to address information conveyed thereto from register file 39. Register file 39 includes at least one register FLS TAG, which stores the format of data operands that are to be used by FPU 31. Snoop logic 37 is associated with register file 39 to monitor the pipeline for load/store operations corresponding to floating-point instructions, for example as may be stored in register FLS TAG. Snoop logic 37 encodes certain information corresponding to floating-point load/store directives, and forwards this information to FPU scheduler 50 on bus LS_TAG. In response to the floating-point AOps and to the load/store directives, FPU scheduler 50 issues control signals to the remaining functional blocks of FPU 31 to execute the instructions communicated thereto.

In this example, FPU 31 includes its own register file 52. Registers included within FPU register file 52 include a floating-point status word (FSW), a floating-point control word (FCW), and an eight-register data stack (consistent with the x86 instruction set). The five floating-point environment registers, useful for interrupt handling, are included in register file 39 (shown in FIG. 3 as ENV), as these registers are not used internally by FPU 31.

FPU router stage 54 operates in conjunction with FPU scheduler 50 to forward the desired operands to the execution stages of FPU 31. FPU router stage 54 receives floating point operands from multiple sources, such sources including load/store units $40_0$, $40_1$ (presenting data on buses LOAD_DATA0, LOAD_DATA1, respectively), floating-point register file 52, constant data ROM 55, and FPU $3^{rd}$ execution stage 60 (which presents writeback data from the results of prior instructions). Constant data ROM 55 stores common floating-point constants (e.g., $\pi$, e, $\sqrt{2}$) that may be used in floating-point instruction execution, particularly in transcendental function evaluation. FPU router stage 54 selects among the various operands for presentation to FPU $1^{st}$ stage 56 for execution.

FPU $1^{st}$, $2^{nd}$, and $3^{rd}$ execution stages 56, 58, 60, respectively, each include conventional arithmetic logic units used in floating-point arithmetic, and each include a status pipeline, a datapath, and a control pipeline. The control pipeline communicates control information regarding the instruction type, rounding mode, precision, exception masks and format control signals, along with the current instruction and operands in the corresponding execution stage. Similarly, the status pipeline uses both the control signals and also the data related information from the data path to generate an instruction status that also travels along with the instruction and operands along the FPU execution pipeline. The data path, including both an exponent pipeline and a mantissa pipeline given the floating-point operation of FPU 31, includes the necessary hardware for performing the arithmetic operations corresponding to the instruction. The output of FPU $3^{rd}$ stage 60 is forwarded back to FPU router 54 for further handling. FPU $1^{st}$, $2^{nd}$, and $3^{rd}$ execution stages 56, 58, 60 include arithmetic and logic circuitry for performing floating-point operations, including circuitry for separately dealing with the mantissas and exponents of the floating-point operands, a multiplier (for the mantissas), adders, rounding and alignment circuitry, and the like, as known in the art for floating-point units.

Communication of control signals and data to and from FPU 31 is effected in several ways. As noted above, multiplexer 45 forwards floating-point instructions to FPU queue stage 49 from integer scheduler 36 and microcontroller 48, and FPU 31 receives certain information regarding the format of operands from register file 39 on bus LS_TAG. Operands retrieved from memory are also forwarded from load/store units 40 to FPU router 54, as noted above. The results of the floating-point instruction are presented by FPU router 54 to register file 39 on bus STORE_DATA, as shown in FIG. 3. Status information, including identification of denormalized operands and other exceptions are communicated from the floating-point status word (FSW) for each floating-point result for storage in FPU error registers 62, via environment registers ENV in register file 39 and also by FPU queue stage 49. Other control signals, including signals to flush the FPU pipeline and to stall FPU operation, are communicated to and from FPU scheduler 50 by way of FPU control bus FCTRL.

As is evident from FIG. 3, FPU 31 in this example includes its own scheduler 50, separate and distinct from scheduler 36 for the integer pipeline of microprocessor 5. According to this preferred embodiment of the invention, therefore, the scheduling of atomic floating-point operations (atomic in the RISC sense) is performed by FPU 31 itself, and does not require the involvement of scheduler 36. In effect, each floating-point instruction issued by scheduler 36 is, from the viewpoint of scheduler 36, an atomic operation in the same sense as atomic operations on the integer side. As a result of this architecture, the integer pipeline need not stall or wait for the completion of floatingpoint instruction execution (as in the case of conventional x86 architecture CISC processors), nor does scheduler 36 become bogged down in the scheduling of both atomic floating-point operations and atomic integer operations, as in the case of conventional RISC processors.

The scheduling operations performed by FPU scheduler 50, FPU queue stage 49, and router 54 in FPU 31 include those operations required to launch floating-point instructions into their execution stages. In this regard, queue stage 49 decodes the atomic floating-point operations received from scheduler 36 into the appropriate control signals, and scheduler 50 applies these control signals to the execution stages in FPU 31, after determining whether the atomic floating-point operations are of the single-cycle, single-pass, or microcoded type, and after identifying and handling any dependencies or hazards caused thereby. In particular, as will be discussed in further detail hereinbelow, schedule 50 includes fault detection circuitry constructed according to the preferred embodiment of the invention, for detecting the presence of read and write faults. Scheduler 50 is also responsible for obtaining and formatting the floating-point operands for launching along with the control signals.

Also in this example, scheduler 50 in FPU 31 also handles instruction completion, including writeback and update of machine status. In the event of any exceptions resulting from the execution of a floating-point operation, such as NaN (not a number), overflow, underflow, and the like, scheduler 50 is also responsible for handling the exceptions and reporting the exceptions to the integer pipeline, as will be described hereinbelow. Scheduler 50 and router 54 also provide an interface with the integer logic, as is necessitated by the distribution of the scheduling function to FPU 31.

Figure 4:
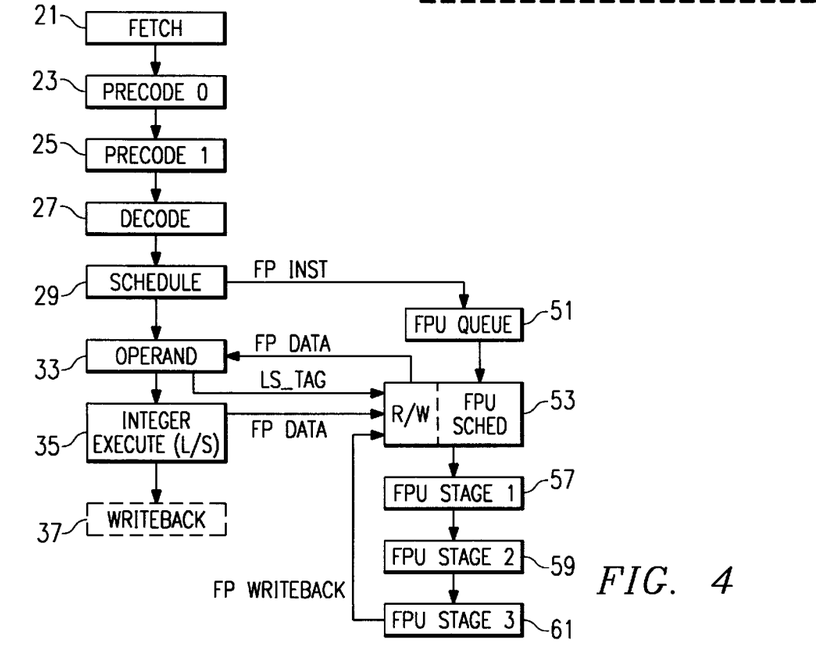
FIG. 4 is a flow chart illustrating the cooperation between the integer and floating-point pipelines in the microprocessor of FIG. 2.

Referring now to FIG. 4, the cooperative operation of the integer and floating-point pipelines in microprocessor 5 according to the preferred embodiment of the invention will now be described. As described in detail hereinabove, both integer and floating-point instructions follow a pipeline (or multiple pipelines, considering the superscalar nature of microprocessor 5 according to this embodiment of the invention) beginning with the instruction fetch stage 21, predecode 0 stage 23, predecode 1 stage 25, and instruction decode stage 27; these operations are performed by fetch unit 26, predecode 0 stage 28, predecode 1 stage 32, and decode unit 34, respectively, as described hereinabove. Schedule stage 29 in the pipeline, performed by scheduler 36 as described above, issues non-floating-point instructions as atomic operations (AOps) or as microcoded sequences, each of which pass through the operand (or register) pipeline stage and are executed (including access of load/store units 40) in stage 35. Writeback operations then are performed in pipeline stage 37.

In schedule stage 29, scheduler 36 forwards floating-point instructions to floating point queue pipeline stage 51, in the form of complete atomic instructions (FP INST in FIG. 4). After buffering by floating-point queue 49, these floating-point instructions are then scheduled by FPU scheduler 50 in FPU scheduling pipeline stage 53. Floating-point queue stage 51 is inserted prior to FPU scheduling stage 53 in the FPU pipeline because all memory accesses require two cycles (register access and load/store) in the x86 architecture. FPU queue pipeline stage 51 is thus used to perform opcode decoding and other instruction routing functions for a new floating-point instruction prior to its scheduling, given the necessity for the additional cycle for memory access.

Following floating-point queue pipeline stage 51, the floating-point instruction next enters the floating-point schedule pipeline stage 53. As shown in FIG. 4, floating-point schedule stage 53 also includes a read/write stage, which is performed by FPU router 54 simultaneously with the scheduling performed by FPU scheduler 50. In floating-point schedule pipeline stage 53, scheduler 50 checks the instruction for dependencies, fetches the register operand (illustrated by the parallel read/write stage), and prepares the instruction for execution. As in the case of integer scheduling described hereinabove, each floating-point instruction is scheduled as atomic operations, and may be single-cycle atomic instructions, single-pass multi-cycle instructions, or microcode instructions. Examples of single-cycle instructions include register exchange instructions (FXCH) and simple arithmetic instructions such as change sign (FCHS) and absolute value (FABS). Single-pass instructions include arithmetic operations such as multiply, add, subtract, and compare (FMUL, FADD, FSUB, FCOM, respectively). Microcode instructions are typically a sequence of single-pass and single-cycle instructions stored in ROM for performing complex operations such as square-root, transcendental function evaluation and the like.

Once scheduling stage 53 is complete, the floating-point instructions are executed in FPU pipeline execution stages 57, 59, 61, which correspond to FPU $1^{st}$, $2^{nd}$, and $3^{rd}$ execution stages 56, 58, 60 of FIG. 3. The results of FPU $3^{rd}$ stage 61 are then returned to parallel read/write stage 53 for forwarding into the integer pipeline, as shown in FIG. 4.

Figure 5:
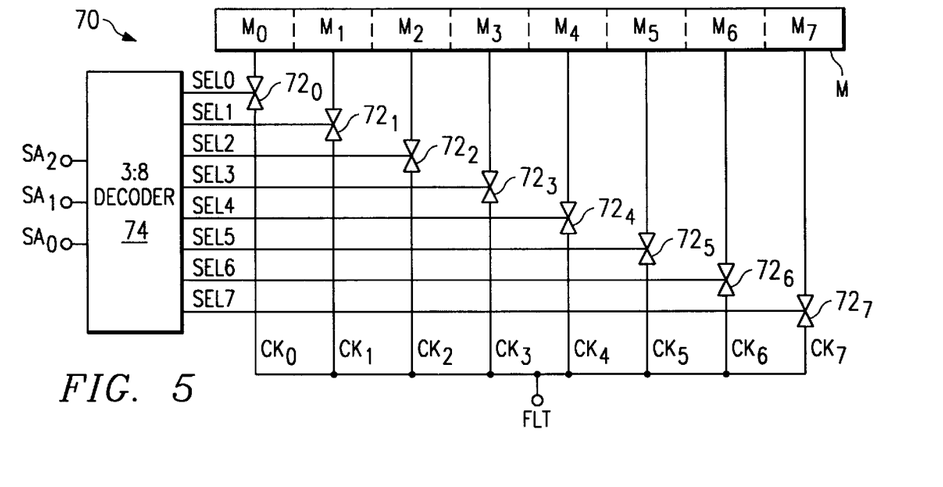
FIG. 5 is an electrical diagram, in block and schematic form, illustrating the construction of fault detection logic according to a first embodiment of the invention.

As noted above, FPU scheduler 50 performs fault detection for each floating-point instruction as it passes through schedule pipeline stage 53. Referring now to FIG. 5, write fault detection logic 70 according to a first embodiment of the invention will now be described in detail. While FIG. 5 and the following description will be presented relative to logic for detecting write faults, it is contemplated that one of ordinary skill in the art will be readily able to implement similar logic for performing read fault detection. Furthermore, the following description will be presented using positive logic (i.e., active states of all signals are at high logic levels), it being further understood that realization of the preferred embodiments of the invention using negative logic will be straightforward to those in the art having reference to this specification.

As noted above, FPU 31 includes an eight-register data stack, consistent with the x86 instruction set. In each instruction, the particular one of the eight registers serving as the destination of a write operation is presented in encoded form on three lines $SA_0$ through $SA_2$ (throughout this description, the subscript $0$ will refer to the least significant bit of any multiple-bit representation). Considering that the instructions are communicated throughout microprocessor 5; the encoding of addresses within instructions helps to minimize the instruction word length, and thus the chip area required to route conductors that communicate the instructions throughout microprocessor 5, at the expense of requiring additional decoding circuitry. In this example, where the destination address is one of eight registers in a stack, the address on lines SA corresponds to an address that has been translated to an absolute address from a relative address (i.e., relative to a top-of-stack counter). In this example, 3:8 decoder 74 receives three lines $SA_0$ through $SA_2$ at its inputs, and includes conventional decoding circuitry for asserting one of its eight output lines SEL0 through SEL7 in response to the binary value communicated on lines $SA_0$ through $SA_2$.

The outputs of decoder 74 on lines SEL0 through SEL7 are applied to the control terminals of corresponding ones of pass gates $72_0$ through $72_7$, respectively. The number of pass gates 72 in fault detection logic 70 according to this embodiment of the invention corresponds to the number of registers addressable by the address on lines SA (namely, eight in this example). Pass gates $72_0$ through $72_7$ receive a data input from a corresponding one of bit positions $M_0$ through $M_7$ in mask register M, and present an output on a corresponding one of lines $CK_0$ through $CK_7$.

Mask register M in this embodiment of the invention, where fault detection logic 70 is for detecting write faults, is a store of indications of whether valid data is present in the stack registers. In this example, each of bit positions $M_0$ through $M_7$ in mask register M indicates, when set (to a high logic level), that its corresponding register contains valid data, such that a subsequent write thereto would constitute a fault. As is typical for modem microprocessors, state information, such as the valid data bits stored in bit positions $M_0$ through $M_7$ in mask register M, is stored in a decoded form, considering that the communication of this information to various portions of microprocessor 5 is relatively limited; as a result, chip area efficiencies favor the storage of state or condition information in decoded form, rather than in encoded form (which would require decoder circuitry).

Figure 6:
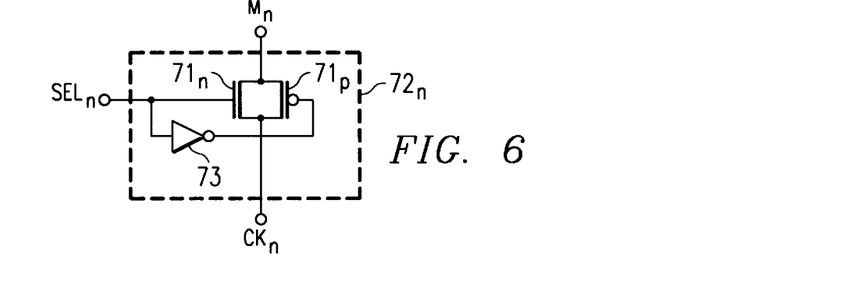
FIG. 6 is an electrical diagram, in schematic form, illustrating the construction of a pass gate in the logic of FIG. 5.

Pass gates 72 may be constructed according to conventional realizations. FIG. 6 illustrates a preferred realization of pass gate $72_n$ according to the preferred embodiment of the invention, where CMOS technology is available. In this example pass gate $72_n$ is realized as n-channel MOS transistor $71n$ and p-channel MOS transistor $71p$ having their source/drain paths connected in parallel between bit position Mn of mask register M and line $CK_n$. The gates of transistors $71n$, $71p$ are controlled by line $SEL_n$ from decoder 74, inverted by inverter 73 prior to application to the gate of transistor $71p$. As such, both of transistors $71n$, $71p$ are turned on responsive to line $SEL_n$ being high, such that the state of bit position $M_n$ is forwarded to line $CK_n$. Conversely, line $SEL_n$ at a low logic level will isolate bit position $M_n$ from line $CK_n$; in this state, line $CK_n$ will float, insofar as pass gate $72_n$ is concerned.

Referring back to FIG. 5, all of lines $CK_0$ through $CK_7$ are connected to one another in wired-OR fashion, driving line FLT accordingly. This wired-OR connection is available to fault detection logic 70, considering that one and only one of the registers will be addressed on lines SA, such that one and only one of pass gates 72 will be turned on at any time. As a result, only one of lines CK will be driven in response to its corresponding bit position state, in turn driving the other ones of lines CK (which are isolated from their corresponding bit position states M by their pass gates 72 being off) to the state of bit position M of the selected register.

In operation, fault detection logic 70 of FPU scheduler 50 operates in connection with the scheduling of a write operation for a floating-point instruction, in scheduling stage 53 (FIG. 4). Decoder 74 receives the address of the one of eight registers in the stack corresponding to the destination of the write operation, decodes this address, and drives one of lines $SEL_0$ through $SEL_7$ high responsive to this address; all other lines $SEL_0$ through $SEL_7$ are driven low. The one of pass gates $72_0$ through $72_7$ that receives the high level control signal on its associated line SEL becomes conductive, while the others of pass gates $72_0$ through $72_7$ remain non-conductive, with their output lines CK floating. The conductive one of pass gates 72 communicates the state of its associated bit position of mask register M to its output line CK which, because of the remainder of pass gates 72 being non-conductive by operation of decoder 74, establishes the state of line FLT.

The result of the fault detection operation is presented on line FLT according to the state of the one of bit positions $M_0$ through $M_7$ of mask register corresponding to the selected register. If bit position M for the selected register is set, indicating valid data is already present in that register such that a write thereto would result in a fault, line FLT will be driven high to indicate that a write fault is detected; if bit position M for the selected register is not set, indicating that valid data is not contained within the selected register so that a write thereto is permissible, line FLT will be driven low to indicate that no fault is present. Scheduling circuitry within FPU scheduler 50 will receive the state of line FLT, and will either forward the instruction along the path toward issue (if no fault is present) or will initiate processing of the fault (if a fault is detected).

In this embodiment of the invention, the number of gate delays involved in fault detection logic 70 is reduced from the conventional fault detection logic of FIG. 1. As before, decoder 74 involves three gate delays, when constructed in the conventional manner; this is equivalent to the gate delay of decoder 2 of the conventional circuitry of FIG. 1. However, the operation of pass gates 72 and the wired-OR function by their common connection constitutes only a single gate delay, such that the delay presented by fault detection logic 70 is only about four gate delays, rather than the six gate delays presented by the conventional arrangement of FIG. 1. Considering that fault detection is in the critical path of instruction scheduling, the savings of two gate delays per instruction results in significant performance improvement of FPU 31 and microprocessor 5.

Figure 7:
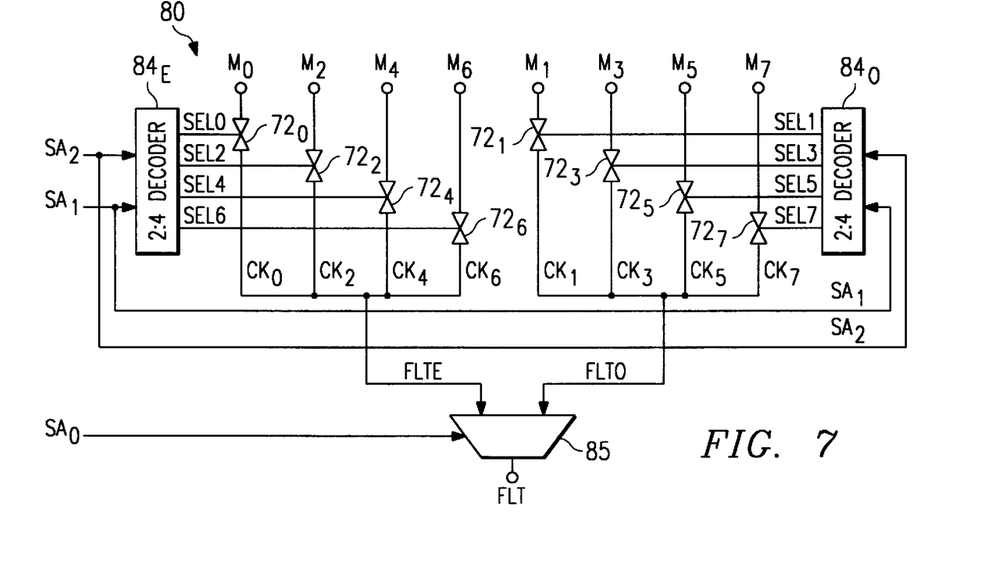
FIG. 7 is an electrical diagram, in block and schematic form, illustrating the construction of fault detection logic according to a second embodiment of the invention.

Referring now to FIG. 7, fault detection logic 80 according to a second embodiment of the present invention, and which provides additional performance improvement, will now be described in detail. Fault detection logic 80 of FIG. 7 will again be described in the context of write fault detection within FPU scheduler 50, it being understood that other applications within microprocessor 5 may similarly benefit from the use of this embodiment of the invention.

Fault detection logic 80 according to this embodiment of the invention partitions the decoding of the register address on lines $SA_0$ through $SA_2$, to further reduce the propagation delay. In this example, the more significant register address bits presented on register address lines $SA_2$, $SA_1$ are decoded separately from the least significant register address bit presented on line $SA_0$. In this regard, fault detection logic 80 includes decoders 84e, 84o which each receive and decode the value presented on register address lines $SA_2$, $SA_1$ in parallel with one another; each of decoders 84e, 84o drive one of four output lines SEL responsive to the state of register address lines $SA_2$, $SA_1$. In this example decoder 84e drives a selected one of even-numbered select lines SEL0, SEL2, SEL4, SEL6, while decoder 84o drives a selected one of odd-numbered select lines SEL1, SEL3, SEL5, SEL7. Since the least significant register address bit on line $SA_0$ is not decoded by decoders 84e, 84o, decoders 84e, 84o in this example each drive one of their output lines active for each address.

Pass gates $72_0$ through $72_7$ each receive the state of a corresponding one of mask register bit positions $M_0$ through $M_7$, and are controlled by a corresponding one of select lines SEL0 through SEL7, to forward (when selected) the state of its mask register bit positions $M_0$ through $M_7$ to a corresponding output line CK0 through CK7. In this embodiment of the invention, even-numbered pass gates $72_0$, $72_2$, $72_4$, $72_6$ are controlled by even-numbered select lines SEL0, SEL2, SEL4, SEL6 from decoder 84e, and have their output lines CK0, CK2, CK4, CK6 connected in wired-OR fashion to line FLTE, which is applied to a first input of output multiplexer 85. Odd-numbered pass gates $72_1$, $72_3$, $72_5$, $72_7$ are controlled by odd-numbered select lines SEL1, SEL3, SEL5, SEL7 from decoder 84o, and have their output lines CK1, CK3, CK5, CK7 connected on wired-OR fashion to line FLTO, which is applied to a second input of output multiplexer 85. As noted above, output multiplexer 85 is controlled by the least significant register address bit on line $SA_0$ to forward the state of either line FLTE or line FLTO, depending upon the state of line $SA_0$, to line FLT to indicate the result of the fault detection.

In operation, the scheduling of a write operation for a floating-point instruction, in scheduling stage 53 (FIG. 4), causes the register address of the destination register for the write to be applied on lines $SA_1$ and $SA_2$ to decoders 84e, 84o, and on line $SA_0$ to output multiplexer 85. Decoder 84e drives one of its four output select lines SEL0, SEL2, SEL4, SEL6 active in response to the address value on lines $SA_1$ and $SA_2$, to cause one of even-numbered pass gates $72_0$, $72_2$, $72_4$, $72_6$ to forward the state of its corresponding mask register bit position $M_0$, $M_2$, $M_4$, $M_6$ to line FLTE; simultaneously, decoder 84o drives one of its four output select lines SEL1, SEL3, SEL4, SEL7 active in response to the address value on lines $SA_1$ and $SA_2$, to cause one of odd-numbered pass gates $72_1$, $72_3$, $72_5$, $72_7$ to forward the state of its corresponding mask register bit position $M_1$, $M_3$, $M_5$, $M_7$ to line FLTO. It will be appreciated that pass gates 72 are selected in pairs, namely pass gates $72_0$, $72_1$ (for register address 00x); pass gates $72_2$, $72_3$ (for register address 01x); pass gates $72_4$, $72_5$ (for register address 10x); and pass gates $72_6$, $72_7$ (for register address 11x). As such, lines FLTE, FLTO will present the states of a logically adjacent pair of mask register bit positions M to output multiplexer 85. Output multiplexer 85 then selects either the state of line FLTE ($SA_0$=0) or the state of line FLTO ($SA_0$=1) to be forwarded to line FLT, and thus to circuitry in scheduler 50, to indicate the result of the write fault detection performed by fault detection logic 80.

The propagation delay of fault detection logic 80 according to this embodiment of the invention is further reduced from that of the conventional fault detection logic of FIG. 1, because of the partitioning of the register address decoding performed therein. In this example, the 2:4 decoding performed by decoders 84e, 84o generally requires two gate delays, as is known in the art, with the operation of pass gates 72 and output multiplexer 85 requiring an additional gate delay. Accordingly, considering that decoders 84e, 84o operate simultaneously and in parallel, fault detection logic 80 thus requires approximately three gate delays for operation, which is a significant improvement over the six gate delays typically required in conventional fault detection circuitry such as described hereinabove relative to FIG. 1.

Of course, it will be apparent to those of ordinary skill in the art having reference to this description that a single decoder may be provided to decode the most significant register address bits and to drive multiple pass gates (e.g., both of the pass gates 72 in a selected pair in this example) with a single select line, if desired.

Figure 8:
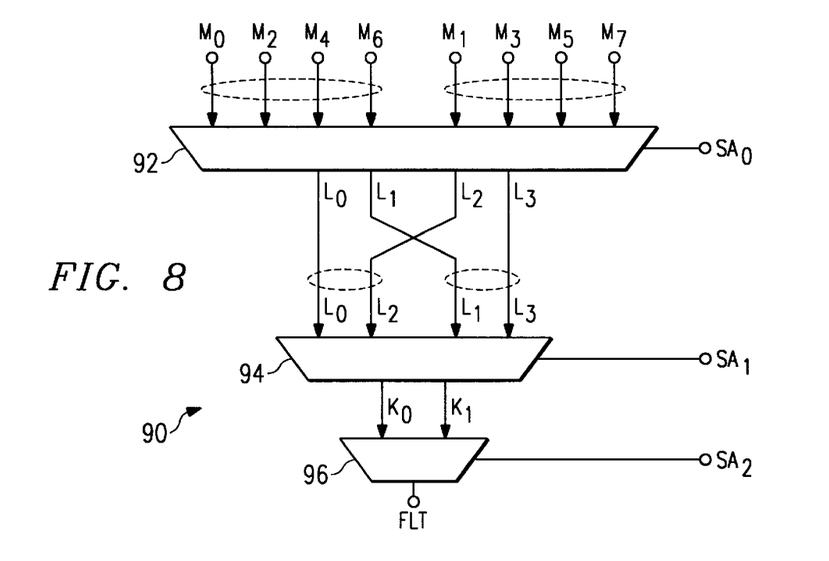
FIG. 8 is an electrical diagram, in block and schematic form, illustrating the construction of fault detection logic according to a third embodiment of the invention.

Referring now to FIG. 8, fault detection logic 90 according to a third embodiment of the present invention will now be described in detail. As will be described in further detail hereinbelow, fault detection logic 90 can provide still further performance improvement over the conventional fault detection logic described relative to FIG. 1, and even providing improvement over the other embodiments of the present invention described hereinabove . As in the prior cases, fault detection logic 90 of FIG. 8 will be described in the context of write fault detection within FPU scheduler 50, it being understood that other applications within microprocessor 5 may similarly benefit from the use of this embodiment of the invention.

In this embodiment of the invention, the register address on lines $SA_0$ through $SA_2$ is not decoded at all, but each individual register address line SA instead controls a multiplexer. In this example, mask register bit positions $M_0$ through $M_7$ are applied to first multiplexer 92 in groups, with even-numbered bit positions $M_0$, $M_2$, $M_4$, $M_6$ as one input group, and odd-numbered bit positions $M_1$, $M_3$, $M_5$, $M_7$ as another input group. First multiplexer 92 is controlled by the least significant bit of the register address on line $SA_0$, to apply one or the other of the input groups to its output lines $L_0$ through $L_3$ responsive to the state of line $SA_0$. In this example, even-numbered bit positions $M_0$, $M_2$, $M_4$, $M_6$ are selected and appear on output lines $L_0$, $L_1$, $L_2$, $L_3$, respectively, when the LSB of the register address on line $SA_0$ is 0 (i.e., when the register address is even); conversely, odd-numbered bit positions $M_1$, $M_3$, $M_5$, $M_7$ are selected and appear on output lines $L_0$, $L_1$, $L_2$, $L_3$, respectively, when the LSB of the register address on line $SA_0$ is 1 (i.e., when the register address is odd).

Output lines $L_0$ through $L_3$ from first multiplexer 92 are applied in pairs to inputs of second multiplexer 94, which is under the control of the next most significant bit of the register address on line $SA_1$. However, output lines $L_1$, $L_2$ are re-routed and exchanged with one another prior to application to second multiplexer 94, such that lines $L_0$, $L_2$ constitute one input pair to second multiplexer 94, with lines $L_1$, $L_3$ constituting a second input pair. Second multiplexer 94 selects one or the other of its input pairs for application to its output lines $K_0$, $K_1$ responsive to the state of line $SA_1$. In this example, lines $L_0$, $L_2$ are forwarded to output lines $K_0$, $K_1$ when the register address bit on line $SA_1$ is 0, and lines $L_1$, $L_3$ are forwarded to output lines $K_0$, $K_1$ when the register address bit on line $SA_1$ is 1.

Output lines $K_0$, $K_1$ are applied to inputs of third multiplexer 96, which is controlled by the most significant register address bit $SA_2$ so as to selectably apply one or the other of lines $K_0$, $K_1$ to line FLT. In this example, line $K_0$ is forwarded to line FLT responsive to the register address MSB on line $SA_2$ is 0, and line $K_1$ is forwarded to line FLT responsive to the register address MSB on line $SA_2$ is 0. Line FLT, as before, indicates the state of the selected one of mask register bit positions $M_0$ through $M_7$, and is forwarded to fault handling circuitry within FPU scheduler 50.

By way of example, the operation of fault detection circuitry 90 in response to a register address of $101_2$ ($5_{10}$) on lines $SA_0$ through $SA_2$ will be considered. For this address value, the LSB of the register address on line $SA_0$ is 1, and as such, first multiplexer 92 will select the odd-numbered mask register bit positions $M_1$, $M_3$, $M_5$, $M_7$ for forwarding to second multiplexer 94 on lines $L_0$, $L_1$, $L_2$, $L_3$, respectively. As a result of the re-routing of lines L, the state of mask register bit positions $M_1$, $M_5$ are presented on lines $L_0$, $L_2$ as one input pair to second multiplexer 94, and the state of mask register bit positions $M_3$, $M_7$ are presented on lines $L_1$, $L_3$ as the other input pair. The next most significant register address bit on line $SA_1$ is 0 in this example, and as such mask register bit positions $M_1$, $M_5$ on lines $L_0$, $L_2$ are forwarded to output lines $K_0$, $K_1$ and thus to the inputs of third multiplexer 96. Because the register address MSB on line $SA_2$ is 1, line $K_1$ is forwarded to line FLT, and therefore, in this example, the state of mask register bit position $M_5$ determines the state of line FLT and thus the write fault result, consistent with the address on lines SA of $101_2$.

Figure 9:
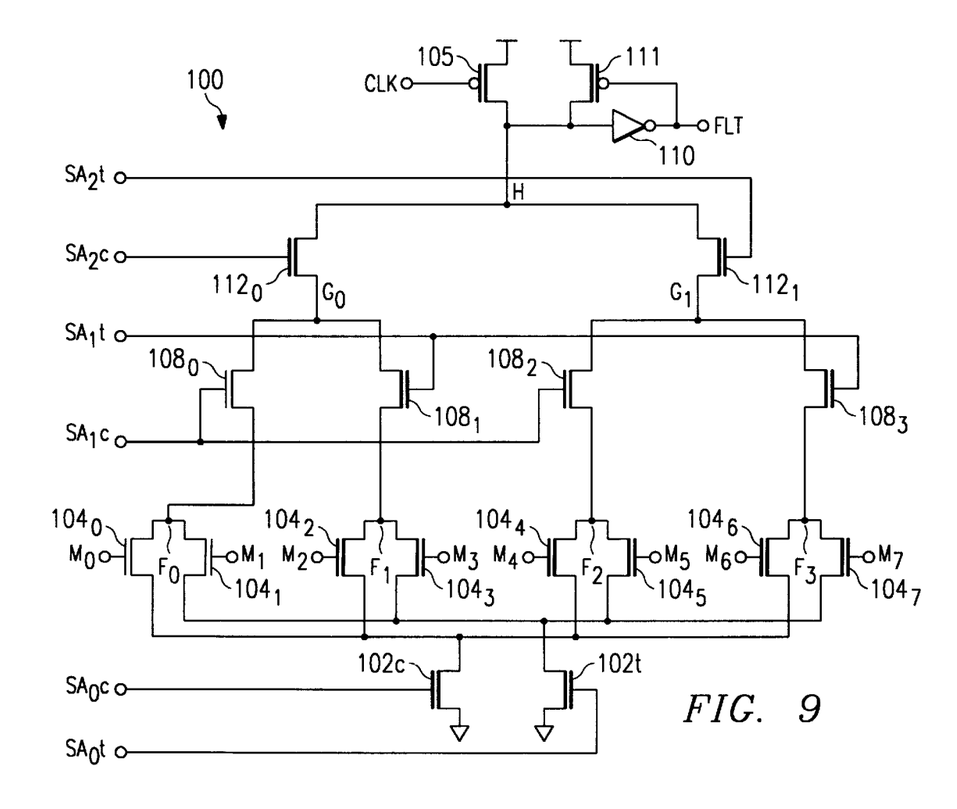
FIG. 9 is a detailed electrical diagram, in schematic form, illustrating the construction of fault detection logic according to a fourth embodiment of the invention.

Referring now to FIG. 9, fault detection logic 100 according to a fourth embodiment of the present invention will now be described in detail. As will be described in further detail hereinbelow, fault detection logic 100 can provide still further performance improvement over the conventional fault detection logic described relative to FIG. 1, and even providing improvement over the other embodiments of the present invention described hereinabove as it involves a minimal propagation delay of approximately one gate delay, as will become apparent from the following description. As in the prior cases, fault detection logic 100 of FIG. 9 will be described in the context of write fault detection within FPU scheduler 50, it being understood that other applications within microprocessor 5 may similarly benefit from the use of this embodiment of the invention.

Fault detection logic 100 is constructed, according to this embodiment of the invention, as multi-stage dynamic precharge-discharge logic. Fault output line FLT is driven by inverter 110, which receives precharge node H at its input. P-channel transistor 111, which has a substantially weaker drive than inverter 110, has its source/drain node connected between $V_{cc}$ and node H at the input of inverter 110, and has its gate connected to line FLT so as to operate as a keeper device. Node H is connected to the drain of p-channel transistor 105, which has its drain connected to $V_{cc}$ and its gate receiving a timing signal on line CLK. Transistor 105, as will be discussed hereinbelow, serves to precharge node H.

Multiple discharge paths are provided in fault detection logic 100, and will operate to discharge node H to ground in the event that the mask register bit position M for a selected register resource is set (thus indicating a write fault). In this embodiment of the invention, each of the register address bits are presented to fault detection logic 100 in a complementary fashion (i.e., on dual-rails); during precharge, both rails of each register address bit will be held in its inactive state (high or low as the case may be), so that precharge of node H is not defeated by one of the discharge paths being conductive. In this embodiment of the invention, true LSB register address line $SA_0t$ is applied to the gate of n-channel transistor $102t$ and complement LSB register address line $SA_0c$ is applied to the gate of n-channel transistor $102c$; each of transistors $102c$, $102t$ have their sources connected to ground. The drain of transistor $102c$ is connected in common to the sources of n-channel transistors $104_0$, $104_2$, $104_4$, $104_6$, which have their gates connected to receive the state of even-numbered mask register bit positions $M_0$, $M_2$, $M_4$, $M_6$, respectively. Similarly, the drain of transistor $102t$ is connected in common to the sources of n-channel transistors $104_1$, $104_3$, $104_5$, $104_7$, which have their gates connected to receive the state of odd-numbered mask register bit positions $M_1$, $M_3$, $M_5$, $M_7$, respectively. Transistors $104_0$, $104_1$ have their sources connected in common, at node $F_0$, to the source of n-channel transistor $108_0$. Similarly, transistors $104_2$, $104_3$, have their sources connected in common, at node $F_1$, to the source of n-channel transistor $108_1$, transistors $104_4$, $104_5$, have their sources connected in common, at node $F_2$, to the source of n-channel transistor $108_2$, transistors $104_6$, $104_7$, have their sources connected in common, at node $F_3$, to the source of n-channel transistor $108_3$.

Further upstream, n-channel transistors $108_0$, $108_2$ each have their gates coupled to receive the complement state of the next most significant bit of the register address, on line $SA_1c$, while n-channel transistors $108_1$, $108_3$ receive the true state of this register address bit on line $SA_1t$. The drains of transistors $108_0$, $108_1$ are connected in common, at node $G_0$, to the source of n-channel transistor $112_0$, while the drains of transistors $108_2$, $108_3$ are connected in common, at node $G_1$, to the source of n-channel transistor $112_1$. The gate of transistor $112_1$ receives the true state of the register address MSB on line $SA_2t$, and the gate of transistor $112_0$ receives the complement state the register address MSB on line $SA_2c$. The sources of transistors $112_0$, $112_1$ are connected in common at node H.

In operation, fault detection logic 100 is initialized by a cycle of the clock signal on line CLK, specifically by a low logic level on line CLK which turns on transistor 105, precharges node H, and sets the state of inverter 110 so that line FLT is held low by the operation of transistor 111. During this time, the true and complement states of the address bits on lines $SA_0t$ through $SA_2t$, and $SA_0c$ through $SA_2c$, are driven to low and high logic levels, respectively, so as to ensure that all discharge paths are non-conductive.

After the precharge cycle is complete (the state of line CLK going high) and during scheduling of an instruction, a register address is received on lines $SA_0t$, $SA_0c$, $SA_1t$, $SA_1c$, $SA_2t$, and $SA_2c$. At or after this time, the state of mask register bit positions $M_0$ through $M_7$ are applied to the gates of transistors $104_0$ through $104_7$, respectively. Precharged node H is discharged upon any combination of address lines $SA_0t$, $SA_0c$, $SA_1t$, $SA_1c$, $SA_2t$, and $SA_2c$ coinciding with a mask register bit position M that is set. For example, if the register address is $101_2$, transistors $102t$, $108_0$, $108_2$, and $112_1$ will be turned on. In this case, the only possible discharge path is through transistors $112_1$, $108_2$, $104_5$, and 102t, considering that transistors $112_0$ and 102c are turned off. Accordingly, the state of node H will be determined by transistor $104_5$, which is controlled by the state of mask register bit position $M_5$. If mask register bit position $M_5$ is not set, transistor $104_5$ will remain non-conductive, node H will not be discharged, and the state of line FLT will remain low, indicating that no write fault is present. Conversely, if mask register bit position $M_5$ is set, transistor $104_5$ will be conductive, which will discharge node H through the path of transistors $112_1$, $108_2$, $104_5$, and 102t, all of which are turned on by the address on lines $SA_0t$, $SA_0c$, $SA_1t$, $SA_1c$, $SA_2t$, and $SA_2c$, and the state of mask register bit position $M_5$.

In this embodiment of the invention, the time required for fault detection is extremely low. Including the operation of precharging node H, the operation of fault detection logic 100 is on the order of one gate stage. In addition, the sharing of transistors 102t, 102c by transistors 104 provides a low transistor count for fault detection logic 100. Alternatively, of course, an appropriate one of transistors 102 may be placed directly in series between the source of one of transistors 104 and ground, if transistor count is not of significant concern. In either case, the time delay required for fault detection according to this embodiment of the invention is extremely low, such as on the order of one gate delay equivalent.

As is evident from the foregoing, each of the embodiments of fault detection logic are described herein in the context of instruction scheduling, and more specifically in the context of instruction scheduling within FPU 31. It is of course contemplated that fault detection logic according to the present invention may readily be used in other locations of microprocessor 5, including within scheduler 36 for fault detection of integer instructions. Furthermore, it is contemplated that the logic and techniques described hereinabove may also be used for purposes other than fault detection. For example, it is contemplated that equivalent logic to the fault detection logic embodiments described hereinabove may be used in connection with cache tag comparison, for example by determining whether a cache tag address corresponds to a cache entry having a particular condition (e.g., dirty bit set, valid bit set), or for other purposes (e.g., LRU bit set). In general, it is contemplated that the present invention will be useful in any application in which status or condition information retained in decoded form (such as in a mask register) is to be interrogated for a resource that is selected using encoded information (such as an address).

Furthermore, while the preferred embodiments of the invention are described hereinabove relative to the example of selecting one of eight register resources in the fault determination, it is of course contemplated that one of ordinary skill in the art having reference to this specification will be readily able to realize the present invention in connection with the number of resources present in any particular implementation.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A circuit for determining a state of a selected resource, comprising:

a register having a plurality of bit positions, each bit position for storing state information corresponding to one of a plurality of resources; and a multiplexer circuit, having control inputs for receiving an encoded address that selects one of the plurality of resources, having a plurality of data inputs for receiving the state information of each of the plurality of bit positions of the register, the multiplexer circuit for conducting, to a result output, the state information of the one of the bit positions of the register responsive to the encoded address;

wherein the multiplexer circuit comprises a plurality of pass gates, each having a conductive path coupled on a first side to receive a corresponding one of the bit positions of the register, and each having a control terminal controlled by the encoded address;

and wherein multiple ones of the plurality of pass gates have their conductive paths connected together on a second side thereof in wired-OR fashion.

2. The circuit of claim 1, wherein the multiplexer circuit further comprises:

a decoder, for decoding at least a portion of the encoded address, and for driving one of a plurality of decoder output lines responsive to the encoded address;

and wherein the control terminal of each of the plurality of pass gates is controlled by one of the plurality of decoder output lines.

3. The circuit of claim 2, wherein the at least a portion of the encoded address decoded by the decoder is all of the encoded address;

wherein all of the plurality of pass gates have their conductive paths connected together on a second side thereof in wired-OR fashion to generate the result output.

4. The circuit of claim 2, wherein the decoder is for decoding a most significant portion of the encoded address;

wherein the plurality of pass gates are arranged in first and second groups, with the plurality of pass gates in the first group having their conductive paths connected together on a second side thereof in wired-OR fashion to produce a first OR output, and with the plurality of pass gates in the second group having their conductive paths connected together on a second side thereof in wired-OR fashion to produce a second OR output;

and wherein the multiplexer circuit further comprises:

an output multiplexer, having a first input for receiving the first OR output, having a second input for receiving the second OR output, and having a control input for receiving a portion of the encoded address that is not decoded by the decoder, for forwarding one of the first and second OR outputs to the result output responsive to the state at the control input.

5. The circuit of claim 4, wherein the decoder comprises a first parallel decoder having decoder output lines connected to the control terminal of each of the first group of the plurality of pass gates, and a second parallel decoder having decoder output lines connected to the control terminal of each of the second group of the plurality of pass gates.

6. A circuit for determining a state of a selected resource, comprising:

a register having a plurality of bit positions, each bit position for storing state information corresponding to one of a plurality of resources; and a multiplexer circuit, having control inputs for receiving an encoded address that selects one of the plurality of resources, having a plurality of data inputs for receiving the state information of each of the plurality of bit positions of the register, the multiplexer circuit for conducting, to a result output, the state information of the one of the bit positions of the register responsive to the encoded address;

wherein the multiplexer circuit comprises:

a first multiplexer, having a first input port for receiving the state information of each of a first group of the plurality of bit positions of the register, having a second input port for receiving the state information of each of a second group of the plurality of bit positions of the register, and having a control input receiving a first bit of the encoded address, for forwarding, to a plurality of outputs of the first multiplexer, the states of the first or second input ports, selected responsive to the first bit of the encoded address; and a second multiplexer, having a first input port for receiving a first group of the plurality of outputs of the first multiplexer, having a second input port for receiving a second group of the plurality of outputs of the first multiplexer, having a control input receiving a second bit of the encoded address, for forwarding, to a plurality of outputs of the first multiplexer, the states of the first or the second input ports, selected responsive to the second bit of the encoded address.

7. The circuit of claim 6, wherein the multiplexer circuit further comprises:

a third multiplexer, having a first input port for receiving a first group of the plurality of outputs of the second multiplexer, having a second input port for receiving a second group of the plurality of outputs of the second multiplexer, having a control input receiving a third bit of the encoded address, for forwarding, to a plurality of outputs of the second multiplexer, the states of the first or the second input ports, selected responsive to the third bit of the encoded address.

8. The circuit of claim 7, wherein the output of the third multiplexer corresponds to the result output.

9. A circuit for determining a state of a selected resource, comprising:

a register having a plurality of bit positions, each bit position for storing state information corresponding to one of a plurality of resources; and a multiplexer circuit, having control inputs for receiving an encoded address that selects one of the plurality of resources, having a plurality of data inputs for receiving the state information of each of the plurality of bit positions of the register, the multiplexer circuit for conducting, to a result output, the state information of the one of the bit positions of the register responsive to the encoded address;

wherein the multiplexer circuit comprises:

a precharge circuit, coupled between a power supply voltage and a precharge node, for precharging the precharge node to a voltage;

an output circuit, having an input coupled to the precharge node, for driving the result output to a voltage responsive to the voltage of the precharge node;

a plurality of discharge paths associated with each of the plurality of bit positions of the register, each comprising:

a state transistor having a conductive path coupled between the precharge node and a reference voltage, and each having a control terminal coupled to receive the state of one of the plurality of bit positions of the register;

a plurality of address transistors, each having a conductive path connected in series with the conductive path of the state transistor, and each having a control terminal coupled to receive a control state corresponding to one of a plurality of bits of the encoded address;

wherein the plurality of address transistors in a one of the plurality of discharge paths associated with the state transistors are all conductive responsive to a value of the encoded address corresponding to the one of the plurality of resources associated with the bit position of the register coupled to the state transistor in the one of the plurality of discharge paths.

10. A microprocessor, implemented into an integrated circuit, comprising:

an execution unit for executing program instructions upon operands to generate a result;

a plurality of resources available for use in connection with the execution of program instructions by the execution unit;

a register having a plurality of bit positions, each bit position for storing state information corresponding to one of the plurality of resources; and a scheduler, for decoding and applying control signals to the execution unit corresponding to program instructions, comprising:

a multiplexer circuit, having control inputs for receiving an encoded address from a program instruction indicating one of the plurality of resources that is to be used in connection with execution of the program instruction, having a plurality of data inputs for receiving the state of each of the plurality of bit positions of the register, the multiplexer circuit for conducting, to a result output, the state of the one of the bit positions of the register responsive to the encoded address.

11. The microprocessor of claim 10, wherein the plurality of resources correspond to a plurality of registers;

and wherein the state information stored in the store indicates whether valid data is present in corresponding ones of the plurality of registers.

12. The microprocessor of claim 10, wherein the execution unit corresponds to a floating-point unit;

and wherein the scheduler is for scheduling floating-point program instructions.

13. The microprocessor of claim 10, wherein the multiplexer circuit comprises:

a decoder, for decoding at least a portion of the encoded address, and for driving one of a plurality of decoder output lines responsive to the encoded address;

a plurality of pass gates, each having a conductive path coupled on a first side to receive a corresponding one of the bit positions of the register, each having a control terminal controlled by one of the plurality of decoder output lines, multiple ones of the plurality of pass gates having their conductive paths connected together on a second side thereof in wired-OR fashion.

14. The microprocessor of claim 13, wherein the at least a portion of the encoded address decoded by the decoder is all of the encoded address;

wherein all of the plurality of pass gates have their conductive paths connected together on a second side thereof in wired-OR fashion to generate the result output.

15. The microprocessor of claim 13, wherein the decoder is for decoding a most significant portion of the encoded address;

wherein the plurality of pass gates are arranged in first and second groups, with the plurality of pass gates in the first group having their conductive paths connected together on a second side thereof in wired-OR fashion to produce a first OR output, and with the plurality of pass gates in the second group having their conductive paths connected together on a second side thereof in wired-OR fashion to produce a second OR output;

and wherein the multiplexer circuit further comprises:
an output multiplexer, having a first input for receiving the first OR output, having a second input for receiving the second OR output, and having a control input for receiving a portion of the encoded address that is not decoded by the decoder, for forwarding one of the first and second OR outputs to the result output responsive to the state at the control input.

16. The microprocessor of claim 10, wherein the multiplexer circuit comprises:
a first multiplexer, having a first input port for receiving the state information of each of a first group of the plurality of bit positions of the register, having a second input port for receiving the state information of each of a second group of the plurality of bit positions of the register, and having a control input receiving a first bit of the encoded address, for forwarding, to a plurality of outputs of the first multiplexer, the states of the first or second input ports, selected responsive to the first bit of the encoded address; and a second multiplexer, having a first input port for receiving a first group of the plurality of outputs of the first multiplexer, having a second input port for receiving a second group of the plurality of outputs of the first multiplexer, having a control input receiving a second bit of the encoded address, for forwarding, to a plurality of outputs of the first multiplexer, the states of the first or the second input ports, selected responsive to the second bit of the encoded address.

17. The microprocessor of claim 16, wherein the multiplexer circuit further comprises:
a third multiplexer, having a first input port for receiving a first group of the plurality of outputs of the second multiplexer, having a second input port for receiving a second group of the plurality of outputs of the second multiplexer, having a control input receiving a third bit of the encoded address, for forwarding, to a plurality of outputs of the second multiplexer, the states of the first or the second input ports, selected responsive to the third bit of the encoded address.

18. The microprocessor of claim 10, wherein the multiplexer circuit comprises:
a precharge circuit, coupled between a power supply voltage and a precharge node, for precharging the precharge node to a voltage;

an output circuit, having an input coupled to the precharge node, for driving the result output to a voltage responsive to the voltage of the precharge node;

a plurality of discharge paths associated with each of the plurality of bit positions of the register, each comprising:
a state transistor having a conductive path coupled between the precharge node and a reference voltage, and each having a control terminal coupled to receive the state of one of the plurality of bit positions of the register;
a plurality of address transistors, each having a conductive path connected in series with the conductive path of the state transistor, and each having a control terminal coupled to receive a control state corresponding to one of a plurality of bits of the encoded address;

wherein the plurality of address transistors in a one of the plurality of discharge paths associated with the state transistors are all conductive responsive to a value of the encoded address corresponding to the one of the plurality of resources associated with the bit position of the register coupled to the state transistor in the one of the plurality of discharge paths.

* * * * *